April 6, 1937.  E. G. RUST  2,076,416
ICE CREAM DISHER
Filed Oct. 29, 1934

Inventor
Edwin G. Rust
Lynn H. Latta

Attorney

Patented Apr. 6, 1937

2,076,416

UNITED STATES PATENT OFFICE 2,076,416

ICE CREAM DISHER

Edwin G. Rust, Sioux City, Iowa

Application October 29, 1934, Serial No. 750,458

4 Claims. (Cl. 107—48)

My invention relates to that type of disher used in scooping up a certain quantity of cream.

An object of my invention is to provide such a disher which will remove the mass of ice cream, at the same time scooping off any surplus amount.

A further object of my invention is to provide scraping means which will allow a maximum leverage to secure a positive scraping effect.

A further object of my invention is to provide a mechanism with as few parts as possible which mechanism will operate the cream removing members as well as the scraping member simultaneously.

A further object of my invention is to provide as short a scraper knife as possible yet attaining a maximum efficiency.

A further object of my invention is to provide easy and convenient means for assembling the disher parts without the necessity of resorting to superfluous screws and the like.

A further object of my invention is to provide a device of this character which is of sturdy and rigid construction.

A further object of my invention is to provide a device of this character which can be manufactured at a very low cost and which can be readily taken apart for cleaning.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1:
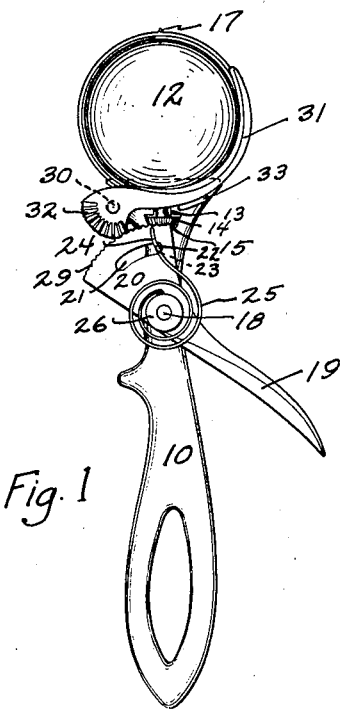
Figure 1 is a plan view of the disher.
Figure 2:
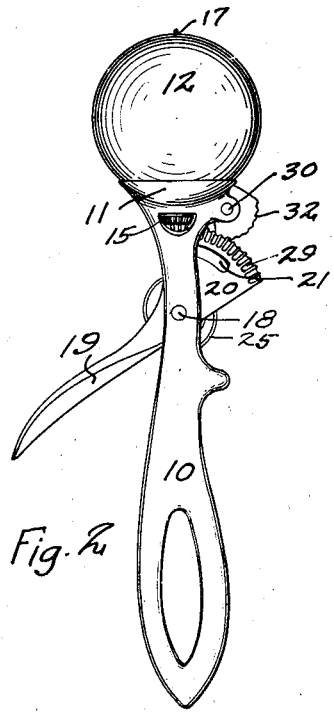
Figure 2 is a rear view of Figure 1.
Figure 3:
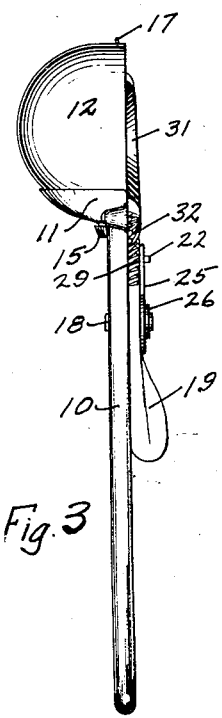
Figure 3 is a side elevation.
Figure 4:
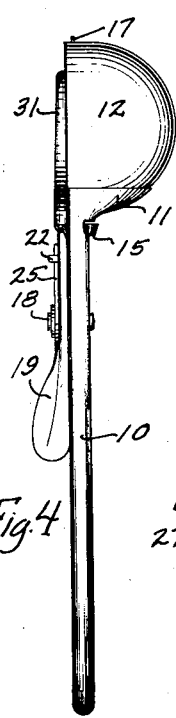
Figure 4 is a further side elevation looking oppositely from Figure 3.
Figures 5, 6, 7:
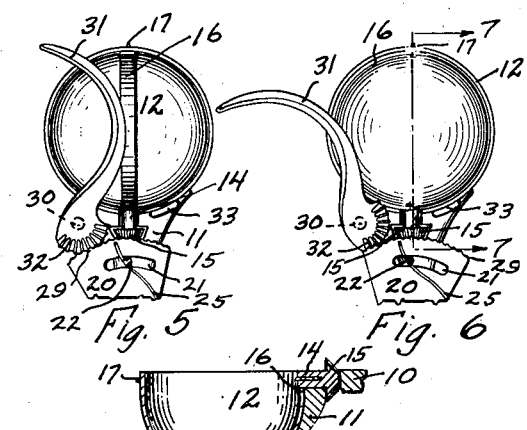
Figure 5 is a broken away plan view showing the scraper knife and other members during movement thereof.
Figure 6 is a similar view of these members practically at the fully opened position.
Figure 7 is a sectional view of Figure 6 taken along the lines 7—7.

I have used the character 10 to represent generally the handle of the disher. Attached to the handle 10 at the flared portion 11 is the customary bowl 12. Coincident with the bowl 12 and the handle 10 is the recessed opening 13 into which is placed the shaft 14. Attached to the shaft 14 is the integral bevel gear 15.

The outer end of the shaft 14 is attached to the scraper member 16 which is arc shaped and conforms to the inside surface of the bowl 12. This scraper is pivoted through the bowl at 17.

Pivoted to the handle 10 by means of the pin 18 is the thumb lever 19. This thumb lever includes the flared portion 20 which portion includes the slot 21.

Attached to the handle 10 and received within the slot 21 is the pin 22. The pin 22 includes a small groove 23 into which the end 24 of the spiral spring 25 is adapted to fit. The inner end of the spiral spring 25 passes through the hub 26 which hub is an integral part of the thumb lever 19, as shown, and extends upwardly therefrom.

Figure 8:
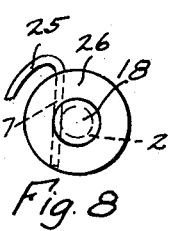
Figure 8 is an enlarged detail view of the thumb lever pivoting mechanism.

It will be seen that the inner end 27 of the spring passes through the hub 26 and is also tangent to the pin 18 and inside of the annular groove 28 (see Figure 8), which is cut in the pin 18. This allows pivoting of the lever 19 and yet permits of locking of the lever to the pin 18.

Furthermore, the placing of the end 24 of the spring 25 in the groove 23 of the pin 22 insures retention of the upper end of the lever.

The portion 20 of the thumb lever 19 includes the bevelled teeth 29 which are adapted to engage with the gear 15 as shown.

Pinned to the handle 10 is the pin 30 which pin is positioned at one side to the center line of the shaft 14. The pin 30 is an integral part of the horizontal scraper arm 31 and is adapted to fit into an opening in the handle 10. The scraper arm 30 also includes beveled teeth 32 which are adapted to engage the teeth 29 of the thumb lever 19. A guard 33 is provided to limit the back movement of the scraper 31, and can be extended if desired to reach over and cover the scraper blade to protect the latter.

It will now be seen from the foregoing description that when the thumb lever 19 is forced inwardly toward the handle 10, the engagement of the teeth 29 with the teeth 32 of the bevelled gear 15 causes a simultaneous motion of the scrapers 16 and 31 in their respective paths of movement.

Since the scraper arm 31 is pivoted at a certain distance from the shaft 14 instead of being pivoted directly at this point as in some scrapers, it is only necessary to use a short blade 31, and furthermore, the strain on this blade is considerably lessened since there will be more of a tendency to pull the cutting arm than would be prevalent in the other manner.

Furthermore, it will be noted that the leverages gained are at a maximum due to the positioning of the various gear teeth.

In removing the various parts for cleaning, it will be noted that this procedure is quite simple. The inner end 27 of the spring 25 is pulled out of the hub 26 and the end 24 is removed from the groove 23 and the pin 22. The spring is then removed and the thumb lever 19, the scraper arm 31 and the further scraper 16 can be removed in succeeding order. Conversely the assembling of these parts can be accomplished in reverse order. This allows for a quick and convenient assembly of the device or disassembly.

It will be noted that the bevelled teeth of the gears provide interlocking arrangements so that there will be no slipping off or accidental removal of any of the pieces, and yet this is all accomplished in an extremely simple manner.

In use, as explained, the bowl 12 is used to scoop up the cream and then when the thumb lever 19 is pressed inwardly, the member 16 will remove that portion of the cream which is included within the bowl and the scraper arm 31 will remove or slice off the surplus protruding portion of cream which will drop back into the container. In this way a great deal of ice cream can be saved which would otherwise be wasted.

It will be noted that the operations occur simultaneously with a minimum amount of effort expended and that the maximum effects take place as explained.

It will now be seen that I have provided an ice cream disher which removes surplus amounts of ice cream, which has a positive scraping effect and which provides means for utilizing a shorter scraper knife with a maximum efficiency.

It will also be seen that I have provided various further features such as; convenient assembly and disassembly without resorting to screws, bolts and the like.

It will be seen further that I have provided such a device which is of sturdy and rigid construction and which can be manufactured at a minimum cost with a minimum amount of material.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. An ice cream disher comprising a bowl, a rotary scraper pivoted within the bowl, a horizontal scraper for scraping off excess cream and adapted to travel across the opening of the bowl, said horizontal scraper being pivoted substantially at a distance from the longitudinal axis of the disher, and including a bevel gear about its pivot, a thumb lever pivoted to the disher handle including a bevel gear adapted to coact with the said scraper arm bevel gear, and said rotary scraper including a bevel gear adapted to coact with the said thumb lever level gear to cause rotation of the rotary scraper simultaneously with the horizontal movement of the horizontal scraper arm.

2. An ice cream disher comprising a horizontal scraper for scraping off excess cream, means for moving the scraper across the face of the bowl including a thumb lever, a pivot attached to the disher handle including a groove about its periphery about which the thumb lever pivots, said thumb lever including an upper flared portion having a slot, a pin attached to the disher handle being received within the slot, said pin having a groove, a spiral spring having its outer end received within the pin groove, and its inner end received within the peripheral groove of the said pivot to cause locking of the said thumb lever to the disher handle.

3. An ice cream disher comprising a bowl, a rotary scraper pivoted within the bowl, a horizontal scraper for scraping off the excess cream and adapted to travel across the opening of the bowl, said horizontal scraper being pivoted substantially at a distance from the longitudinal axis of the disher, and including a bevel gear arranged annularly about its pivot, a thumb lever pivoted to the disher handle including a bevel gear adapted to co-act with said scraper arm bevel gear, and said rotary scraper including a bevel gear adapted to co-act with said thumb lever bevel gear to cause rotation of the rotary scraper simultaneously with the horizontal movement of the horizontal scraper, the bevel gear of said thumb lever being positioned above the bevel gears of said horizontal scraper and said rotary scraper to lock and retain the same in position.

4. An ice cream disher comprising a bowl, a rotary scraper pivoted within the bowl, a horizontal scraper for scraping off the excess cream and adapted to travel across the opening of the bowl, said horizontal scraper being pivoted substantially at a distance from the longitudinal axis of the disher, and including a bevel gear arranged annularly about its pivot, a thumb lever pivoted to the disher handle including a bevel gear adapted to co-act with said scraper arm bevel gear, and said rotary scraper including a bevel gear adapted to co-act with said thumb lever bevel gear to cause rotation of the rotary scraper simultaneously with the horizontal movement of the horizontal scraper, the bevel gear of said thumb lever being positioned above the bevel gears of said horizontal scraper and said rotary scraper to lock and retain the same in position, the pivoting means for said thumb lever including a pin having a peripheral groove, said thumb lever including an upper flared portion having a slot, a pin attached to the disher handle being received within the slot, said pin having a groove, a flat spiral spring having an outer end received within the pin groove and its inner end received within the peripheral groove of the said pivot pin to cause retention of the said thumb lever to the disher handle.

EDWIN G. RUST.